(12) United States Patent
Bauer et al.

(10) Patent No.: US 11,236,798 B2
(45) Date of Patent: **\*Feb. 1, 2022**

(54) GUIDE/DAMPING UNIT AND PISTON HOUSING UNIT

(71) Applicant: SUSPA GmbH, Altdorf (DE)

(72) Inventors: Michael Bauer, Freihung (DE);
Michael Weder, Nuremberg (DE)

(73) Assignee: SUSPA GMBH, Altdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,869

(22) Filed: Mar. 9, 2020

(65) Prior Publication Data

US 2020/0208708 A1 Jul. 2, 2020

Related U.S. Application Data

(63) Continuation of application No. 15/616,023, filed on Jun. 7, 2017, now Pat. No. 10,690,212.

(30) Foreign Application Priority Data

Jun. 8, 2016 (DE) .................... 10 2016 210 162.5

(51) Int. Cl.
| | |
|---|---|
| *F16F 11/00* | (2006.01) |
| *F16F 9/36* | (2006.01) |
| *F16F 7/09* | (2006.01) |
| *F16F 7/08* | (2006.01) |
| *F16F 9/06* | (2006.01) |
| *F16F 9/32* | (2006.01) |

(52) U.S. Cl.
CPC .................. *F16F 9/36* (2013.01); *F16F 7/08* (2013.01); *F16F 7/09* (2013.01); *F16F 9/063* (2013.01); *F16F 9/3271* (2013.01); *F16F 9/366* (2013.01); *F16F 2232/08* (2013.01)

(58) Field of Classification Search
CPC ...... F16F 7/09; F16F 7/095; F16F 7/08; F16F 7/082; F16F 2222/04; F16F 9/36; F16F 9/366

See application file for complete search history.

(56) References Cited

U.S. PATENT DOCUMENTS

| | | | |
|---|---|---|---|
| 4,934,493 A | 6/1990 | Bauer et al. | |
| 5,085,297 A | 2/1992 | Bauer et al. | |
| 5,174,551 A | 12/1992 | Mintgen | |
| 5,386,975 A | 2/1995 | Wallis | |
| 6,247,687 B1* | 6/2001 | Jensen | B64C 25/64 |
| | | | 188/129 |
| 10,690,212 B2* | 6/2020 | Bauer | F16F 7/08 |
| 2005/0230203 A1* | 10/2005 | Knapp | F16F 9/0281 |
| | | | 188/322.17 |

(Continued)

FOREIGN PATENT DOCUMENTS

| | | |
|---|---|---|
| CN | 1519418 A | 8/2004 |
| CN | 204004153 U | 12/2014 |

(Continued)

*Primary Examiner* — Nicholas J Lane

(74) *Attorney, Agent, or Firm* — McGlew and Tuttle, P.C.

(57) ABSTRACT

A piston housing unit includes a housing with a longitudinal axis, a piston rod that is displaceable, in particular along the longitudinal axis and/or around the longitudinal axis, a guide/damping unit for guiding and damping the displacement of the piston rod.

26 Claims, 7 Drawing Sheets

(56) References Cited

U.S. PATENT DOCUMENTS

2008/0264744 A1\* 10/2008 Atwater .................. F16F 7/09
  188/381

FOREIGN PATENT DOCUMENTS

| DE | 2602620 A1 | 7/1977 | | |
|---|---|---|---|---|
| JP | H04231744 A | 8/1992 | | |
| JP | 2003130118 A | 5/2003 | | |
| WO | WO-2014158493 A1 \* | 10/2014 | ............. | D06F 37/20 |

\* cited by examiner

GUIDE/DAMPING UNIT AND PISTON HOUSING UNIT

CROSS REFERENCE TO RELATED APPLICATIONS

This application is a continuation under 37 CFR 1.53(b) of prior U.S. patent application Ser. No. 15/616,023 filed Jun. 7, 2017, which claims the priority of German Patent Application Ser. No. 10 2016 210 162.5, filed Jun. 8, 2016, the entire contents of each application are incorporated herein by reference.

FIELD OF THE INVENTION

The invention concerns a guide/damping unit and a piston housing unit.

BACKGROUND OF THE INVENTION

Piston housing units are known from prior art, for example in the form of linear dampers.

SUMMARY OF THE INVENTION

It is a task of the present invention to provide a piston housing unit with improved functionality, which is in particular realized in an uncomplicated and robust way.

This task is solved according to the invention by a guide/damping unit for guiding and damping a piston rod in a piston housing unit, wherein the guide/damping unit has a guide element and at least one damping element, as well as by a piston housing unit comprising a housing having a longitudinal axis, a displaceable piston rod and a guide/damping unit according to one of the preceding claims for guiding and damping the displacement of the piston rod.

According to the invention it has been found that an improved, and in particular extended functionality of a piston housing unit is possible by means of a guide/damping unit. The guide/damping unit has a guide element and at least one damping element. The piston housing unit has a housing with a longitudinal axis and a piston rod, in particular displaceable along the and/or around the longitudinal axis. A piston can be mounted on the piston rod. The guide/damping unit serves for guiding and damping the displacement of the piston rod. The guide damping unit guarantees function integration. The guide function and the damping function are combined in a single unit. The guide element and the damping element are fixed to one another in the guide/damping unit. The guide/damping unit forms an assembly in which the guide element and the damping element are integrated. The guide element and the damping element are arranged non-displaceably in the guide/damping unit. In particular, the guide element and the damping element are arranged non-displaceably in the guide/damping unit relative to a rotation about a longitudinal axis of the piston housing unit and in particular relative to an axial displacement along the longitudinal axis. Thanks to the guide function the guide/damping unit acts similar to a sliding bearing or a guide bushing. The piston housing unit, and in particular the guide/damping unit, are realised in an uncomplicated way and are robust to use.

The guide/damping unit encloses the piston rod in particular around its entire circumference, so that the guide/damping unit guarantees the guiding and the damping of a rotation in relation to the longitudinal axis. The piston rod penetrates the guide/damping unit completely in an axial direction of the longitudinal axis, so that an axial guiding and damping of the piston rod displacement is guaranteed.

The design of the guide/damping unit with a guide element enables an improved guide function. The guide element can in particular be fitted to the housing and is in particular designed in a sleeve shape.

The damping element enables a direct damping of the piston rod displacement.

The design of the guide element, in which the guide element has two, in particular identically designed half-shells, enables an advantageous production and assembly. The guide element in particular has two identically designed half-shells, which can be connected with each other.

The design of the guide element, in which the guide element has at least one linear guide section, in particular two linear guide sections spaced a distance from each other along the longitudinal axis, enables a direct guiding of the piston rod. At least one linear guide section serves for the in particular fully circumferential recess of the piston rod. The linear guide section is designed as a through bore, having an inner cross-section, which equals the cross-section of the piston rod. Two linear guide sections are in particular envisaged, arranged at distances along the longitudinal axis.

The damping element encloses the piston rod, in particular around its full circumference.

The design of the damping element, in which the damping element has a damping ring or at least one, in particular two damping strips, is uncomplicated. A damping strip in particular can be cut from the necessary damping material directly and in an uncomplicated way. The damping strip can be applied around the piston rod. It is feasible to envisage two or more damping strips separately from each other.

The design of the guide/damping unit, in which the damping element is arranged in a damping element recess of the guide element, enables an uncomplicated and direct arrangement of the damping element in the guide element. The damping element is held in a damping element recess envisaged for this, in particular in an axial as well as a radial direction in relation to the longitudinal axis. Additional fitting elements are not necessary. The design of the guide/damping unit is particularly robust.

A design, in which the damping element recess is designed as an inner groove, is particularly advantageous. An inner groove can be formed on the guide element as a single part.

At least one grease pocket, in particular integrated into the guide/damping unit, enables a reliable regreasing of the damping element. The function of the piston housing unit, in particular the damping function, is guaranteed over the expected lifetime of the piston housing unit. The grease pocket in particular serves as a grease reservoir, the volume of which is adapted to suit the expected lifetime.

The design of the grease pocket, in which the grease pocket is arranged in a half-shell of the guide element, and is in particular designed as an indentation in an inner surface of the inner groove, enables an advantageous integration into the guide element.

The design, in which the damping effect can be set, in particular by means of a pre-tensioning force, with which a damping strip is arranged in the guide/damping unit, enables an adjustment of the damping effect of the piston housing unit. The damping effect of the piston housing unit can be individualized. The damping effect of the piston housing unit can be adapted to suit requirements. In particular an active returning force can be selectively set from the damping strip to the piston rod by means of a pre-tensioning force, with which a planar damping strip is arranged in the guide/ damping unit. Depending on the returning force of the damping strip on the piston rod, friction force results, and with it the friction effect on the piston rod displacement.

The arrangement of the guide/damping unit fitted in a housing guarantees a defined guiding function.

A design of the piston housing unit, wherein the guide/damping unit (10) is integrated into a housing, enables an advantageous construction. The fact that the guide/damping unit is integrated, in particular completely, into the housing of the piston housing unit means that the piston housing unit has a simple geometry free from indentations. The manufacture of individual components is therefore simplified. Assembly of the components with each other is simplified. The manufacturing effort for individual components is reduced. The piston housing unit can be produced cost efficiently. The guide/damping unit of the piston housing unit can in particular advantageously be used as a guide rail for a seat in an automobile or as a shaft bearing in a housing.

A design of the housing, in which the housing is designed tubular, in particular in a hollow cylinder shape, enables an effective light construction design of the piston housing unit. The housing can be produced cost effectively as a pipe section. In particular the housing is designed as a hollow cylinder shape. With a corresponding piston design a relative rotation of the piston rod with the piston around the longitudinal axis is possible in relation to the housing. It is feasible that the housing and/or the piston have a non-round contour, which can for example be designed angular, in particular rectangular. The piston is in particular non-rotatably arranged in the housing. A rotation lock between the housing and the piston is guaranteed with the piston rod. It is of advantage if the cross-section shape, in particular the inner contour of the hollow profile, of the housing has a cross-section shape that does not change along the longitudinal axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
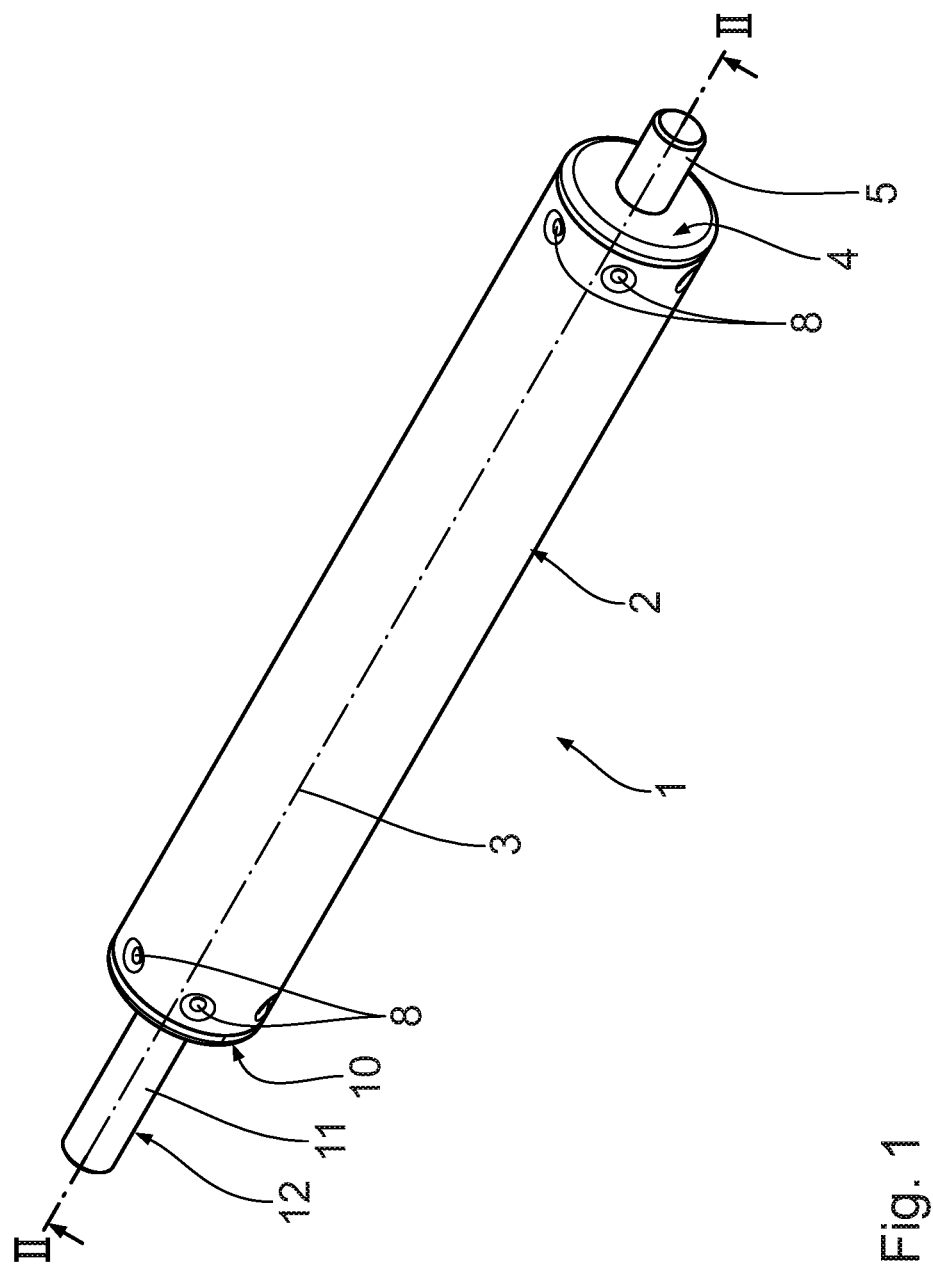
FIG. 1 is a perspective view of a piston housing unit according to the invention.
Figure 2:
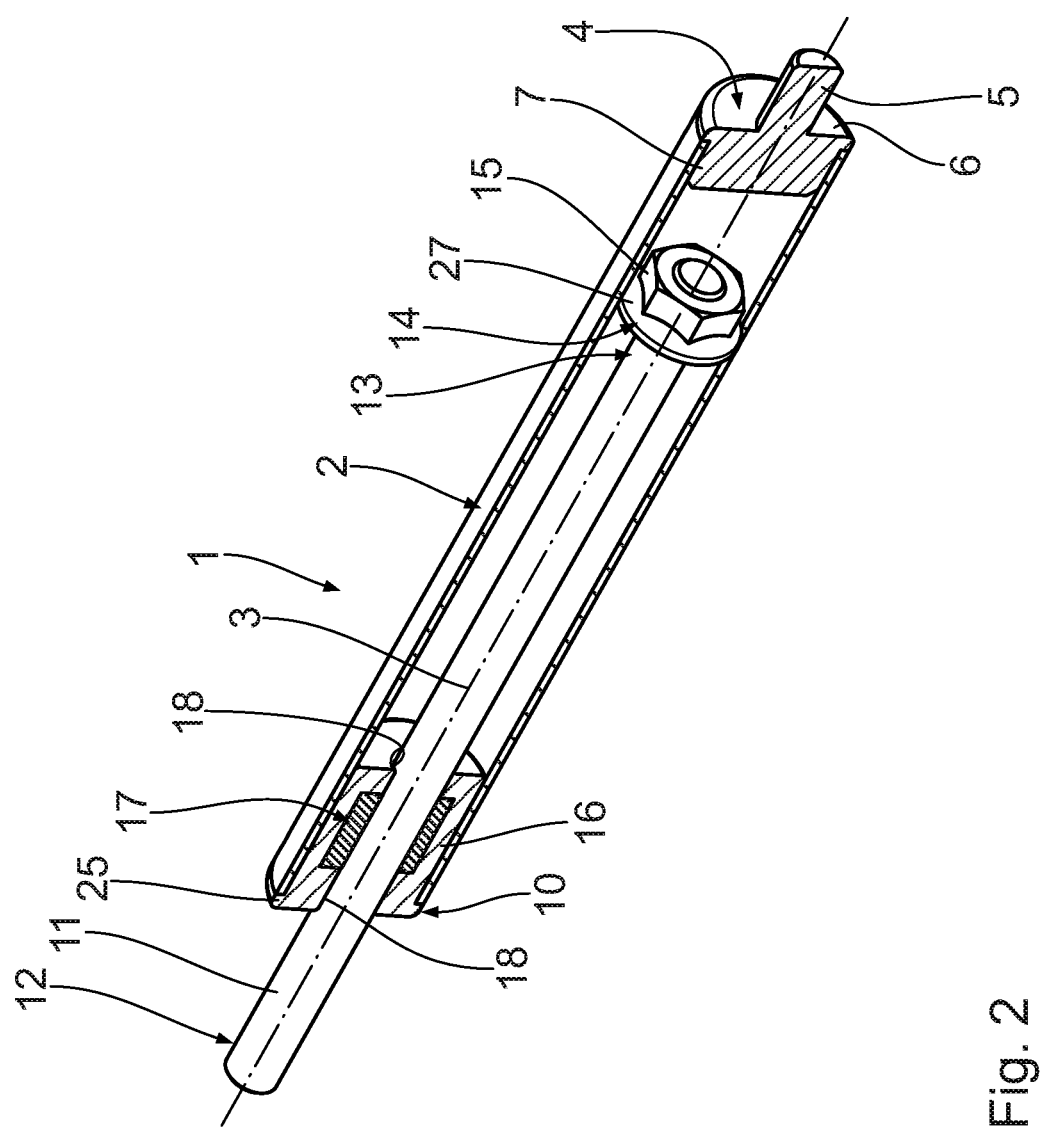
FIG. 2 is a longitudinal sectional view along section line II-II in FIG. 1.
Figure 3:
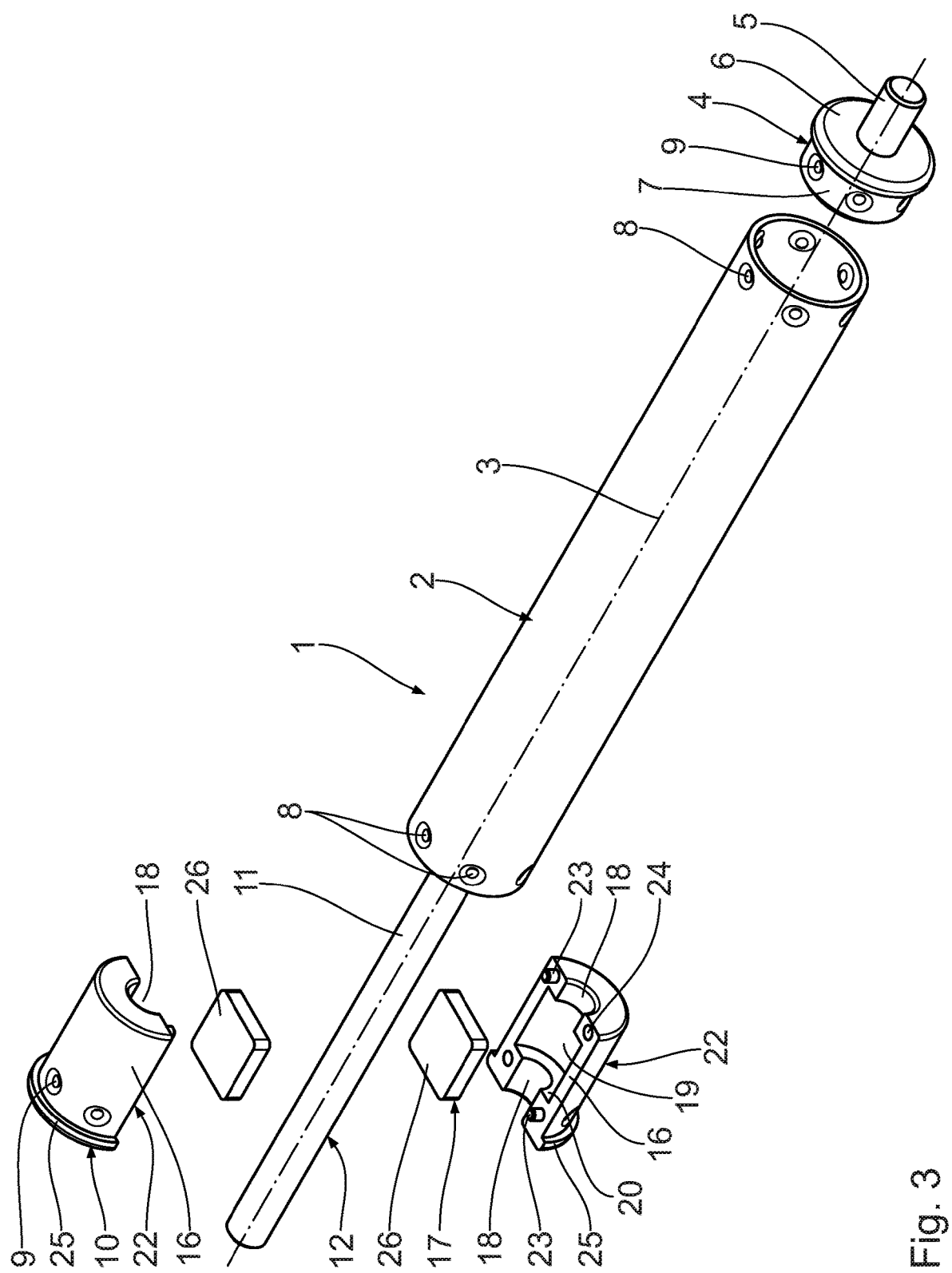
FIG. 3 is an exploded view of the piston housing unit according to FIG. 1.

A piston housing unit 1 has a hollow cylinder housing 2 with a longitudinal axis 3. The housing 2 of the piston housing unit 1 is closed by means of a closure cap 4 at a first end, illustrated on the right in FIG. 1. The closure cap 4 has a fitting lug 5 arranged concentric to the longitudinal axis 3, shaped of a single piece on a cover plate 6. The cover plate 6 is oriented vertical to the longitudinal axis 3. The lug is arranged on an outside of the cover plate 6 facing away from the housing 2. The closure cap has an insertion collar 7 on an inside facing the housing 2, with which the closure cap 4 can be inserted into the first end of the housing 2. The insertion collar 7 can be positively, and in particular non-disconnectably connected with the housing 2. For this several, in particular six indentations 8 can be envisaged along the outer circumference of the housing 2, which engage corresponding counter-indentations 9 in a radial direction in relation to the longitudinal axis 3. The closure cap 4 is held securely on the housing 2 axially as well as radially in relation to the longitudinal axis 3.

A guide/damping unit 10 is arranged on the housing 2 at a second end opposite the closure cap 4. The guide/damping unit 10 is inserted into the facing open end of the housing 2 much like the closure cap 4 and is positively fixed there by means of indentations 8 and counter-indentations 9.

A piston rod 11 is guided from the housing 2 through the guide/damping unit 10 along the axial alignment of the longitudinal axis 3. The piston rod 11 is arranged outside of the housing 2 with a first, free end 12. An opposing, second end 13 is arranged inside the housing 2. A piston 14, designed as an annular disc 27 according to the embodiment example shown, is fitted on the second end 13 of the piston rod 11 and is held on the piston rod 11 by means of a fitting nut 15. The piston 14 according to the first embodiment example is a collar-out protection. The piston 14 prevents the piston rod 11 being pulled out of the housing accidentally. The annular disc 27 has an outer diameter that is greater than an inner diameter of a through opening of the guide/damping unit 10. The annular disc 27 serves as a stop element on the guide/damping unit 10.

The guide/damping unit 10 will now be explained in more detail with reference to FIGS. 3 to 6. The guide/damping unit 10 has a stop collar 25 on a facing side that faces away from the housing 2. The stop collar 25 projects further than the guide/damping unit 10 in a radial direction in relation to the longitudinal axis 3. The stop collar 25 delimits a maximum insertion depth of the guide/damping unit 10. The guide/damping unit 10 can be arranged directly in, and defined in relation to the axial position of the housing 2. The assembly of the piston housing unit 1 is simplified.

The guide/damping unit 10 has a guide element 16 and a damping element 17. The guide element 16 and the damping element 17 are integrated in the guide/damping unit.

The guide element 16 is of a sleeve-shaped design with a through opening along the longitudinal axis 3, through which the piston rod 11 is guided. The guide element 16 has two linear guide sections 18 arranged at distances from each other along the longitudinal axis 3. The linear guide sections 18 each extend from a facing end of the guide/damping unit 10. The linear guide sections 18 are designed as through channels with an inner contour shaped as hollow cylinders, which approximately equal the outer contour of the piston rod 11 at a level vertical to the longitudinal axis 3.

A damping element recess 19, into which the damping element 17 can be inserted, is envisaged along the longitudinal axis 3 between the linear guide sections 18. The damping element recess 19 is delimited by each of the neighboring linear guide sections 18 in an axial direction in relation to the longitudinal axis 3. The damping element recess 19 is designed as an inner groove and has a groove depth that is deeper than the linear guide section 18. An axial abutment shoulder 20 is formed between the damping element recess 19 and each of the neighboring linear guide section 18.

The guide/damping unit 10, in particular the guide element 16, has two grease pockets 21, which each serve as a grease reservoir for the damping element 17. The grease pockets 21 are each arranged on an inside of the inner groove, i.e. on an inside of the damping element recess 19. Grease can be supplied from the grease pockets 21 directly to the damping element 17.

The guide element 16 consists of several parts, in particular in the form of two identically designed half-shells 22. The half-shells 22 can be separated from each other along a separation level that includes the longitudinal axis 3. The half-shells 22 have connection elements 23 and connection counter-elements 24 corresponding with the same. The connection elements 23 are designed as spigots according to embodiment example shown, which can engage corresponding spigot recesses. The half-shells 22 are designed as identical components. The manufacturing effort for the guide/damping unit 10 is reduced. The connection elements 23 and the connection counter-elements 24 guarantee that the half-shells 22 are arranged to define each other. A loosening of the connection is ruled out once the guide/damping unit 10 has been pushed into the housing 2. Connecting the half-shells 22 guarantees a secure and undetachable holding of the guide/damping unit 10 in the housing 2 of the piston housing unit 1.

It is also feasible that the guide element is designed as one part or with more than two half-shells. It is of advantage if the individual parts from which the guide element 16 is formed are designed as identical parts. It is for example also possible to envisage quarter-shell elements.

The damping element 17 is designed in the form of two identically designed damping strips 26. The damping strips 26 are flat, in particular level, in their starting condition, i.e. before they have been inserted into the damping element recess 19 of the guide element 16. Inserting the damping strips 26 into the guide/damping unit 10 deforms the damping strips 26, in particular bends them into a cylinder half-shell shape. The damping strips 26 are made from an elastic damping material, in particular from foamed plastic, in particular foam material.

The inherent rigidity of the damping material for the damping strips 26 is in particular at least so great that a returning force is provided, which effects that the damping strips 26 aim to independently transform themselves into the flat starting condition. The damping strips 26 thus apply a compression force to the piston rod 11.

The damping strips 26 have a strip width oriented along the longitudinal axis 3. The strip width of the damping strip 26 equals the width of the damping element recess 19.

According to an embodiment example not shown, the width of the damping element recess 19 can be greater than the strip width of the damping strip 26. The width of the damping element recess 19 is in particular at least 105% of the strip width of the damping strip 26, in particular at least 110%, in particular at least 120%, and in particular at least 125%. With this design the damping strip 26 can be axially displaced along the longitudinal axis 3 in the damping element recess 19. With an axial displacement of the piston rod 11 the damping strip 26 is initially also axially displaced along the longitudinal axis 3 due to static friction until the facing side of the damping strip 26 abuts against the end of the damping element recess 19, in particular against the axial abutment shoulder 20. The axial abutment shoulder 20 prevents a further axial displacement of the damping strip 26. A further displacement of the piston rod 11 causes a relative movement between the piston rod 11 and the damping strip 26. From this point in time a friction force is generated by the abutment of the damping strip 26 against the piston rod 11.

There is therefore no or only a low damping force at the start of the axial displacement of the piston rod with this embodiment example. Such a piston housing unit enables a so-called soft start characteristic.

The damping strip 26 is designed with a strip thickness that is greater than the groove depth of the damping element recess 19. This guarantees that a radial pressing of the damping strip 26 against the piston rod is reliably guaranteed. The strip thickness of the damping strip 26 in particular is at least 105% of the groove depth, in particular at least 115%, in particular at least 125%, in particular at least 130%, and in particular at least 135%. The groove depth of the damping element recess 19 can also substantially equal the strip thickness of the damping strip 26.

The strip length of the damping strips 26 is sized in such a way that a substantially closed damping ring extending along the entire circumference of the damping element recess 19 is formed when the damping strip is inserted. It is also feasible to envisage more than two damping strips 26 or only one damping strip. It is also feasible to use a closed damping ring as a damping element 17.

Figure 5:
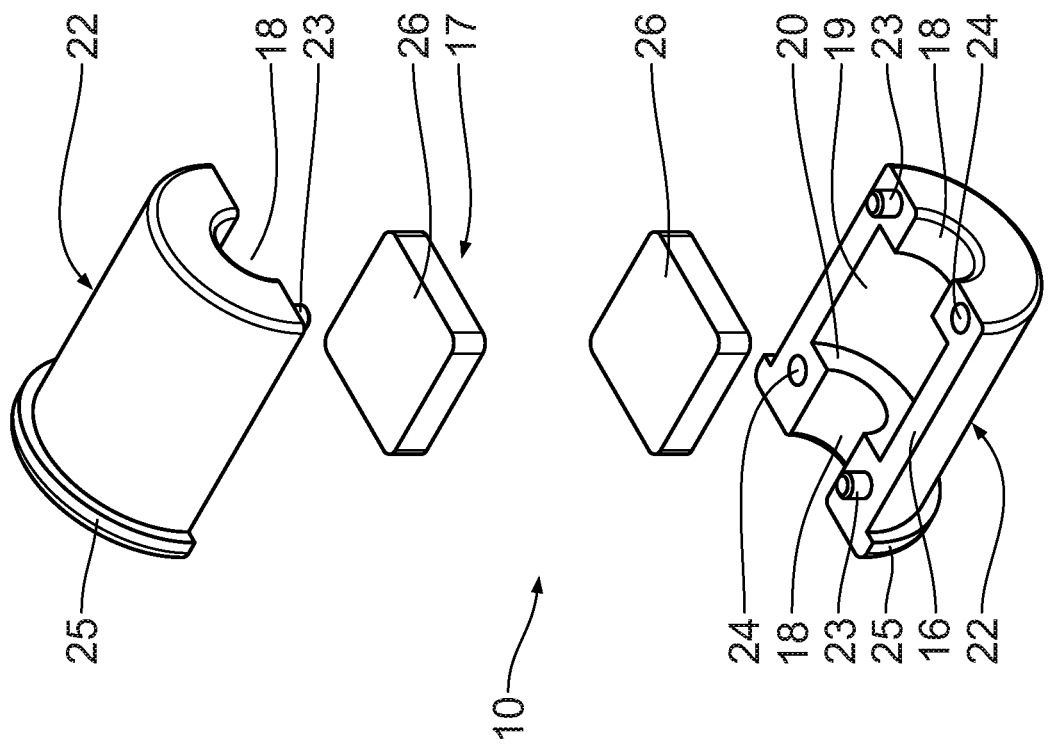
FIG. 5 is an exploded view of the guide/damping unit according to FIG. 4.
Figure 4:
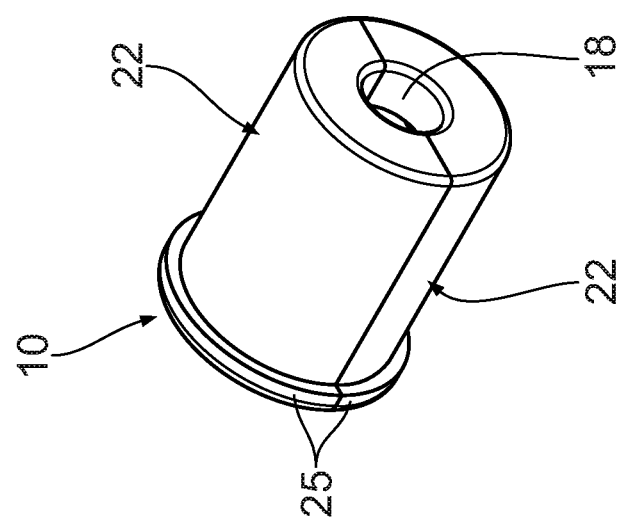
FIG. 4 is an enlarged view of the guide/damping unit of the piston housing unit according to FIG. 1.
Figure 6:
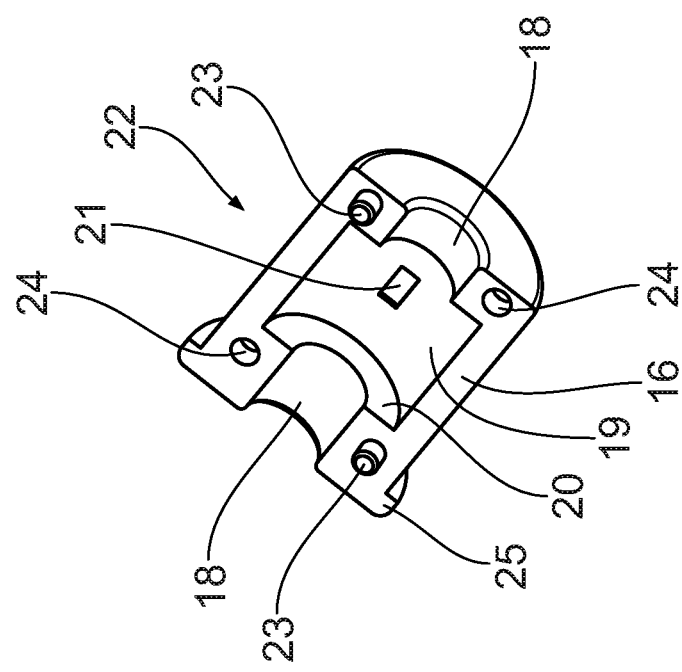
FIG. 6 is a perspective view of a half-shell of a guide element of the guide/damping unit.

The major advantage of the design of the guide/damping unit 10 as illustrated in FIG. 5 is that the unit 10 consists of just two different individual parts, namely the half-shells 22 and the damping strips 26. Manufacture of the guide/damping unit 10 is possible in a cost effective way.

The assembly of the piston housing unit 1 will be explained in more detail below. The housing 2 is first closed at the first end by means of the closure cap 4. The piston rod 11 is then inserted into the housing 2 with the second end 13. The two half-shells 22 are arranged around the piston rod 11 with an inserted damping strip 26 each in the area of the piston rod 11 that projects from the housing 2 and connected with each other. By connecting the half-shells 22 the damping strips 26 are pressed into the damping element recess 19 and bent into a half-shell shape, and the half-shells 22 connected with each other are then pushed along the piston rod 11 into the housing 2 as a guide/damping unit 10 until the guide/damping unit 10 lies against the housing 2 with the facing side of the abutment collar 25. The guide/damping unit 10 is fitted to the housing 2 above the indentations 8 and the counter-indentations 9.

Figure 7:
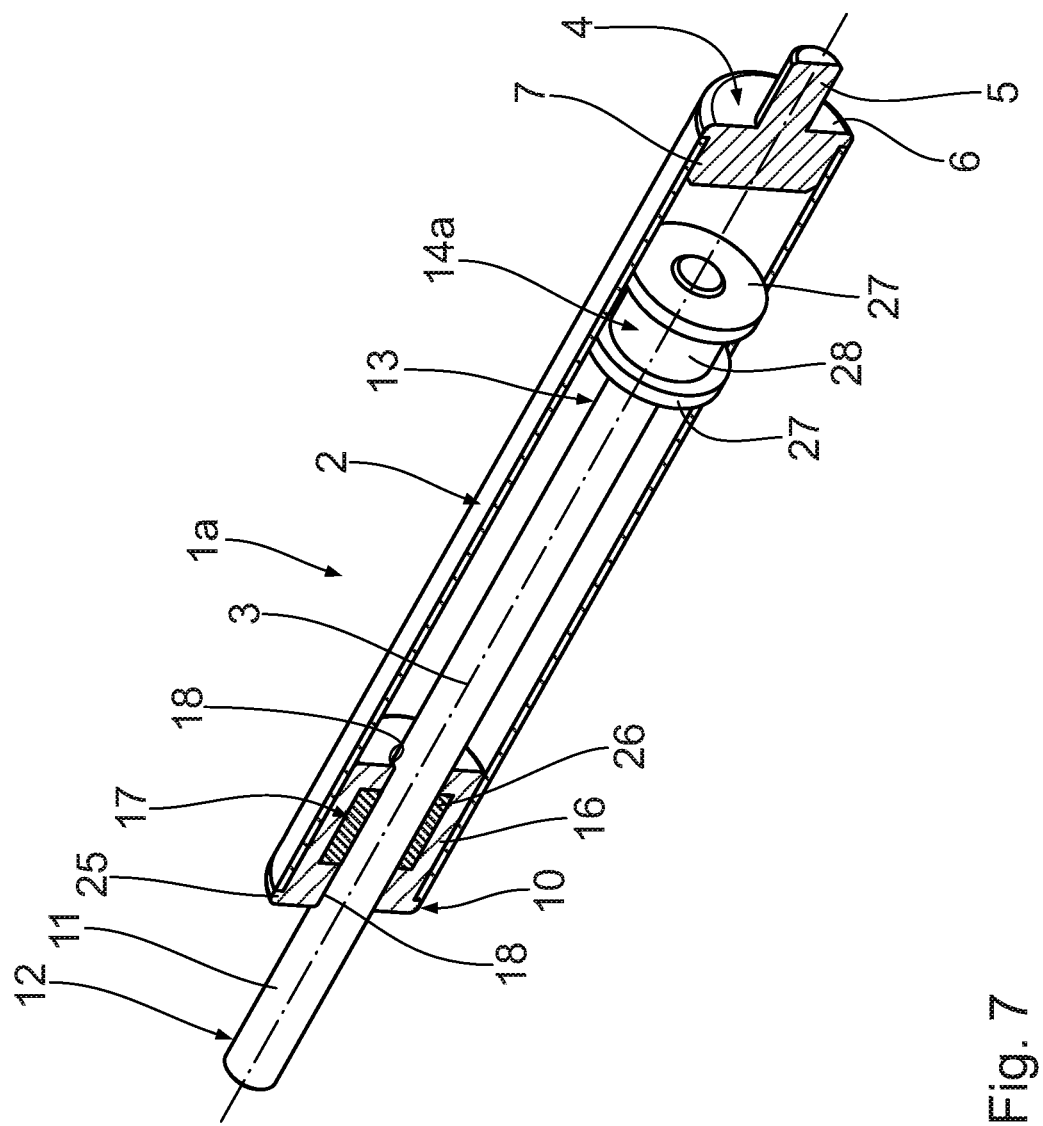
FIG. 7 is a longitudinal sectional view of a second embodiment example of a piston housing unit according to FIG. 2.

A second embodiment example of the invention will be described below with reference to FIG. 7. Components of identical construction are identified with the same reference numbers than for the first embodiment example, to the description of which we herewith refer. Components of different construction, but with an identical function are identified with postposed a.

The major difference compared to the first embodiment example is that the piston 14a has two discs 27 arranged at a distance from each other long the longitudinal axis 3. The discs 27 are in particular designed identically. The discs 27 have an outer diameter that is smaller than an inner diameter of the cylindrical housing 2. An annular groove 28 is formed between the discs 27. According to the second embodiment example, the piston 14a serves as a plug-out protection.

The annular groove 28 can in particular be designed as a distancer sleeve arranged between the two annular discs 27. The discs 27 can be riveted to the piston rod 11.

Figure 8:
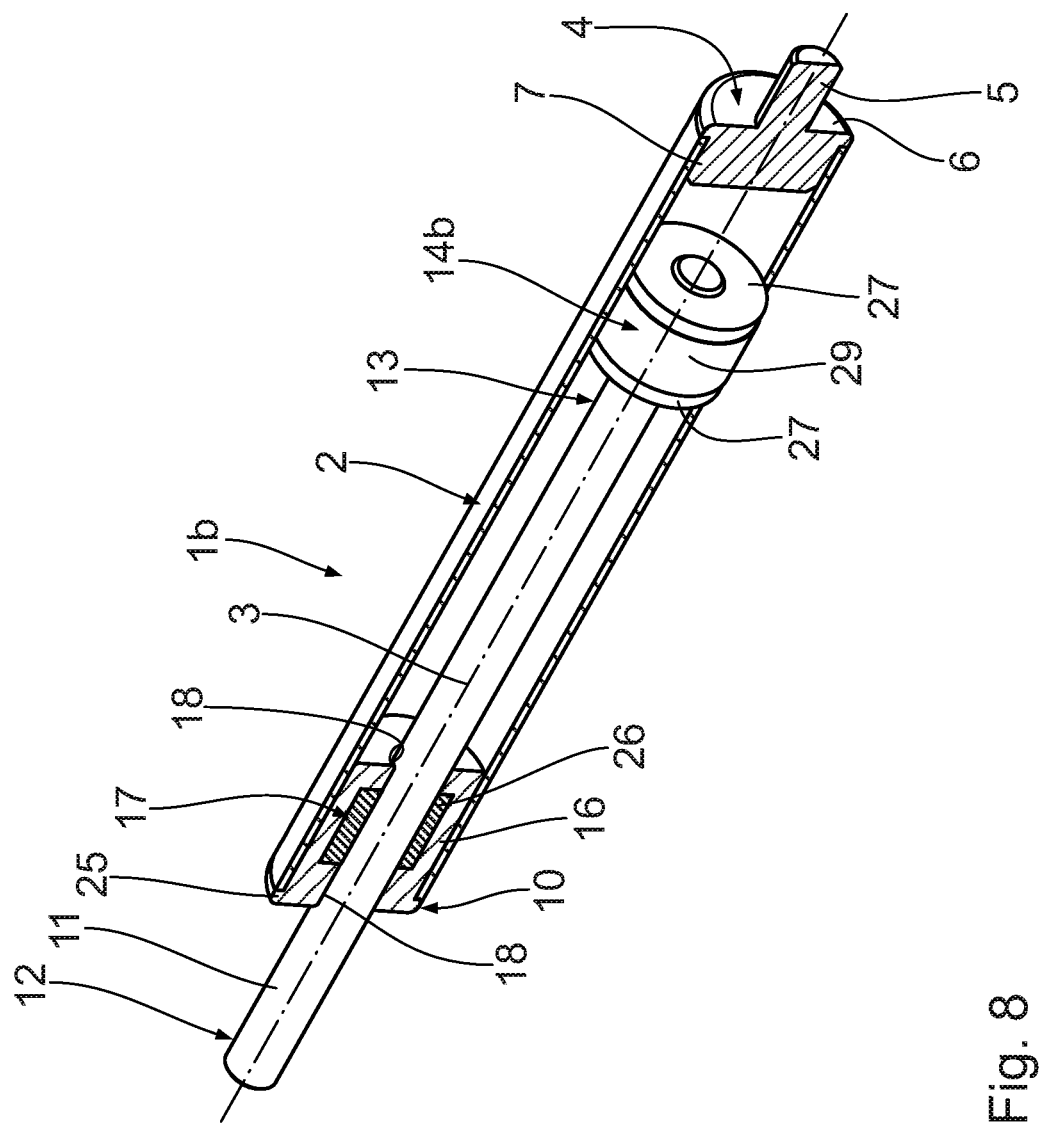
FIG. 8 is a longitudinal sectional view of a third embodiment example of a piston housing unit according to FIG. 2.

A third embodiment example of the invention will be described below with reference to FIG. 8. Components of identical construction are identified with the same reference numbers than for the first two embodiment examples, to the descriptions of which we herewith refer. Components of different construction, but with an identical function are identified with postposed b.

Compared to the second embodiment example the third embodiment example differs in that an additional friction element 29 is arranged in the annular groove 28, and is in particular held there. The additional friction element 29 is designed in such a way that it rubs against an inside of the housing 2. According to this embodiment example the piston 14b fulfils a double function, namely serves as a pull-out protection, and enables additional fiction force to be generated during an axial and/or rotation displacement of the piston rod 11. The friction force that can be generated with the piston housing unit 1b is increased.

While specific embodiments of the invention have been shown and described in detail to illustrate the application of the principles of the invention, it will be understood that the invention may be embodied otherwise without departing from such principles.

What is claimed is:

1. A piston housing unit, comprising:
    a tubular housing having a longitudinal axis and a cylindrical outer contour which is constant along the longitudinal axis;
    a displaceable piston rod; and
    a guide/damping unit comprising:
        a guide element comprising two half-shells, wherein each of the two half-shells has a cross section in a plane oriented perpendicular to the longitudinal axis, the cross section being half-ring shaped; and
        at least one damping element, the at least one damping element having one of a damping ring and at least one damping strip, wherein the one of the damping ring and the at least one damping strip is made of an elastic damping material, the guide/damping unit being fitted in the tubular housing, the guide/damping unit comprising a stop collar connected to the guide element, the stop collar comprising a collar portion extending in a radial direction relative to a longitudinal axis of the guide/damping unit, the housing comprising an axial end surface facing in a direction parallel to the longitudinal axis of the housing, the collar portion being in direct contact with the axial end surface, the guide/damping unit comprising a sleeve portion having an outer diameter which corresponds to an inner diameter of the tubular housing, the guide/damping unit comprising a facing side arranged within the tubular housing, the facing side being axially unsupported within the tubular housing.

2. A piston housing unit according to claim 1, wherein the tubular housing comprises an inner surface defining a plurality of projections, the guide element comprising a guide element outer surface, the guide element outer surface defining a plurality of recesses, each of the recesses receiving at least a portion of one of the projections, the guide/damping unit being configured to at least dampen movement of the piston rod in the tubular housing, the sleeve portion comprising an outer sleeve portion surface extending continuously from the stop collar to one end of the guide/damping unit located in an interior of the tubular housing, the inner surface completely surrounding the outer sleeve portion surface, the guide/damping unit being axially supported via only the axial end surface.

3. A piston housing unit according to claim 1, wherein the guide/damping unit is integrated into the housing, the at least one damping element having a damping element thickness, the guide element comprising a groove having a groove depth, at least a portion of the at least one damping element being arranged in the groove, the damping element thickness being greater than the groove depth, the sleeve portion comprising a first sleeve portion located at one end of the tubular housing, the first sleeve portion defining one end of the guide/damping unit, wherein no structure axially supports the one end of the guide/damping unit, the stop collar being defined by an extension of the first sleeve portion, the sleeve portion comprising a second sleeve portion located at an axially spaced location from the first sleeve portion with respect to the longitudinal axis, the second sleeve portion comprising a radially extending second sleeve portion surface defining another end of the guide/damping unit, wherein the another end is located in an interior of the tubular housing, the radially extending second sleeve portion surface defining at least a portion of a piston rod movement space in the tubular housing, wherein at least a portion of the piston rod is axially movable in the piston rod movement space with respect to the longitudinal axis.

4. A piston housing unit according to claim 1, wherein the guide/damping unit further comprises a closure cap located opposite the guide damping unit, at least a portion of the closure cap being arranged in an interior space of the housing, the closure cap comprising an insertion collar, the insertion collar comprising an insertion collar portion extending in the radial direction relative to the longitudinal axis of the guide/damping unit, the housing comprising another axial end surface facing in another direction away from the axial end surface, the another direction being parallel to the longitudinal axis, the another axial end surface being arranged opposite the axial end surface, the insertion collar portion being in direct contact with the another axial end surface, the facing side facing in a direction of the closure cap.

5. A piston housing unit according to claim 1, wherein the two half-shells are identical to each other, the stop collar being provided at one end of the guide/damping unit, wherein another end of the guide/damping unit is arranged in an interior of the tubular housing, wherein no structure axially supports the another end of the guide/damping unit.

6. A piston housing unit according to claim 1, wherein the guide element has at least one linear guide section.

7. A piston housing unit according to claim 1, wherein the guide element has two linear guide sections spaced a distance from each other along the longitudinal axis of the housing.

8. A piston housing unit according to claim 1, wherein the damping element encloses the piston rod.

9. A piston housing unit according to claim 1, wherein the damping element is arranged in a damping element recess of the guide element.

10. A piston housing unit according to claim 9, wherein the damping element recess is configured as an inner groove.

11. A piston housing unit according to claim 1, further comprising at least one grease pocket.

12. A piston housing unit according to claim 11, wherein the grease pocket is arranged in one of the two half-shells of the guide element.

13. A piston housing unit according to claim 11, wherein the grease pocket is configured as an indentation in an inner surface of a damping element recess of the guide element.

14. A piston housing unit according to claim 1, wherein the sleeve unit has an axial length oriented parallel to the longitudinal axis, the axial length being greater than the outer diameter of the sleeve portion.

15. A piston housing unit, comprising:
a tubular housing having a longitudinal axis;
a displaceable piston rod;
a guide/damping unit comprising a guide element and at least one damping element, the guide element comprising two half-shells, the damping element having one of a damping ring and at least one damping strip, the one of the damping ring and the at least one damping strip being made of an elastic damping material, wherein a piston is fitted on the piston rod, wherein the piston is a collar-out protection such that the piston rod is prevented from being pulled out of the housing accidentally, the piston comprising two annular discs connected to the piston rod, wherein an additional friction element is arranged between the annular discs, the additional friction element being configured to rub against an inside of the housing, the guide/damping unit comprising a sleeve portion having an outer diameter which corresponds to an inner diameter of the tubular housing, the guide/damping unit comprising a facing side arranged within the tubular housing, the facing side being axially unsupported within the tubular housing.

16. A piston housing unit according to claim 15, wherein the housing comprises an inner surface defining a plurality of projections, the guide element comprising a guide element outer surface defining a plurality of recesses, each of the recesses receiving at least a portion of one of the projections, the piston being fixed to the piston rod via at least a nut, wherein a diameter of the nut is greater than a diameter of a through opening of the guide/damping unit.

17. A piston housing unit according to claim 15, wherein the two half-shells are identical to each other, the guide/damping unit being configured to at least dampen movement of the piston rod in the tubular housing, the sleeve portion comprising an outer sleeve portion surface located in an interior of the tubular housing, the outer sleeve portion surface extending continuously from one end portion of the guide/damping unit to another end portion of the guide/damping unit located in an interior of the tubular housing, wherein no structure axially supports the another end portion, the tubular housing having an inner surface, the inner surface completely surrounding the outer sleeve portion surface.

18. A piston housing unit according to claim 15, wherein the guide element has at least one linear guide section, the sleeve portion comprising a first sleeve portion located at one end of the tubular housing, the first sleeve portion defining one end of the guide element, the sleeve portion comprising a second sleeve portion located at an axially spaced location from the first sleeve portion with respect to the longitudinal axis, the second sleeve portion comprising a radially extending second sleeve portion surface defining another end of the guide/damping unit, wherein the another end is located in an interior of the tubular housing, wherein no structure axially supports the another end of the guide/damping unit, the radially extending second sleeve portion surface defining at least a portion of a piston rod movement space in the tubular housing, wherein at least a portion of the piston rod is configured for axial movement in the piston rod movement space with respect to the longitudinal axis.

19. A piston housing unit according to claim 15, wherein the guide element has two linear guide sections spaced a distance from each other along the longitudinal axis, the guide/damping unit comprising a first end and a second end, wherein the second end of the guide/damping unit is arranged in an interior of the tubular housing and the first end is located at a position located outside of the interior of the tubular housing, wherein no structure axially supports the another end of the guide/damping unit.

20. A piston housing unit according to claim 15, wherein the damping element encloses the piston rod, the facing side facing in a direction away from the one of the damping ring and the at least one damping strip.

21. A piston housing unit according to claim 15, wherein the damping element is arranged in a damping element recess of the guide element.

22. A piston housing unit according to claim 21, wherein the damping element recess is configured as an inner groove.

23. A piston housing unit according to claim 15, further comprising at least one grease pocket.

24. A piston housing unit according to claim 23, wherein the at least one grease pocket is arranged in one of the two half-shells of the guide element.

25. A piston housing rod unit according to claim 23, wherein the at least one grease pocket is configured as an indentation in an inner surface of a damping element recess of the guide element.

26. A piston housing unit according to claim 15, wherein the sleeve unit has an axial length oriented parallel to the longitudinal axis, the axial length being greater than the outer diameter of the sleeve portion.

\* \* \* \* \*